(12) United States Patent
Wagner et al.

(10) Patent No.: US 7,453,777 B2
(45) Date of Patent: Nov. 18, 2008

(54) METHOD AND DEVICE FOR OPTICAL FORM MEASUREMENT AND/OR ESTIMATION

(75) Inventors: Christoph Wagner, Königsbach-Stein (DE); Reiner Wagner, Ispringen (DE)

(73) Assignee: Obe Ohnmacht & Baumgartner GmbH & Co. KG (DE)

( * ) Notice: Subject to any disclaimer, the term of this patent is extended or adjusted under 35 U.S.C. 154(b) by 424 days.

(21) Appl. No.: 10/536,861

(22) PCT Filed: Nov. 22, 2003

(86) PCT No.: PCT/EP03/13152

§ 371 (c)(1),
(2), (4) Date: Jul. 20, 2005

(87) PCT Pub. No.: WO2004/051186

PCT Pub. Date: Jun. 17, 2004

(65) Prior Publication Data

US 2005/0254378 A1   Nov. 17, 2005

(30) Foreign Application Priority Data

Nov. 29, 2002 (DE) ............................... 102 58 130
Sep. 19, 2003 (DE) ............................... 103 45 349

(51) Int. Cl.
*G11B 5/09* (2006.01)
(52) U.S. Cl. ................. 369/53.1; 369/47.1; 382/141; 382/146
(58) Field of Classification Search ........... 382/141, 382/146; 369/53.1, 47.1
See application file for complete search history.

(56) References Cited

U.S. PATENT DOCUMENTS

| 4,912,336 | A | * | 3/1990 | Nayar et al. | 250/559.17 |
| 5,777,244 | A | | 7/1998 | Kumagai et al. | 73/865.8 |
| 6,747,260 | B2 | * | 6/2004 | Miramonti et al. | 250/208.1 |
| 6,813,377 | B1 | * | 11/2004 | Gopalakrishnan et al. | 382/146 |
| 6,858,826 | B2 | * | 2/2005 | Mueller et al. | 250/208.1 |
| 7,248,374 | B2 | * | 7/2007 | Bridges | 356/614 |

FOREIGN PATENT DOCUMENTS

| DE | 19944354 | 4/2001 |
| EP | 0046241 | 2/1982 |
| EP | 0047936 | 3/1982 |
| JP | 2000-097641 | 4/2000 |
| WO | WO 01/69214 | 9/2001 |

OTHER PUBLICATIONS

Search Report dated Aug. 31, 2006.
International Preliminary Report On Patentability, mailing date Jul. 5, 2005; and attached PCT Notification of Transmittal of Copies of Translation of the International Preliminary Report on Patentability (Chapter I or Chapter II of the Patent Corporation Treaty). Total pp. 7.
International Search Report for PCT/EP03/13152 dated Mar. 24, 2004.

(Continued)

*Primary Examiner*—Samir A Ahmed
*Assistant Examiner*—Michael Vanchy, Jr.
(74) *Attorney, Agent, or Firm*—Ostrolenk, Faber, Gerb & Soffen, LLP

(57) ABSTRACT

A method for optical shape recording and/or evaluation of optically smooth, glossy or optically rough surfaces wherein a photometric stereo method and a deflectometric method are combined using a scattering body so that the positions on the scattering body surface are two-dimensionally encoded.

18 Claims, 3 Drawing Sheets

OTHER PUBLICATIONS

Lee M-R: "3D Shape Reconstruction of Hybrid Reflectance Using the LMS Algorithm" International Journal of Pattern Recognition and Artificial Intelligence, World Scientific Publishing Company, Singapore, Jun. 2001.

Lee K M et al: "Shape From Shading With a Generalized Reflectance Map Model" Computer Vision and Image Understanding, Academic Press, Aug. 1997.

"Shape and Reflectance from an Image Sequence generated using Extended Sources" by Shree K. Nayar et al dated 1989.

"Determining Shape and Reflectance Properties objects by using Diffuse illumination" by Tae-Eun Kim et al dated 1996.

"3-D Shape Recovery of Hybrid Reflectance Surface using Indirect Diffuse Illumination" by Tae-Eun Kim et al dated 1995.

* cited by examiner

METHOD AND DEVICE FOR OPTICAL FORM MEASUREMENT AND/OR ESTIMATION

CROSS REFERENCE TO RELATED APPLICATION

The present application is a 35 U.S.C. §§ 371 national phase conversion of PCT/EP2003/013152, filed 22 Nov. 2003, which claims priority of German Application No. 102 58 130.4, filed 29 Nov. 2002 and German Application No. 103 45 349.0, filed 19 Sep. 2003. The PCT International Application was published in the German language.

BACKGROUND OF THE INVENTION

The invention relates to a method and a device for optical shape recording and/or evaluation of objects and surfaces, in particular glossy surfaces. The term glossy refers below to objects whose optical roughness lies in the transition range between optically rough and optically smooth surfaces. Optically rough surfaces are defined as having a roughness which is substantially greater than the wavelength of visible light (about 0.5 micrometers), while optically smooth surfaces have a roughness much less than the wavelength. Because of this property, optically rough surfaces exhibit nondirectional, diffuse reflection or transmission of light. Examples of this are paper, chalk, matt disks etc. Optically smooth surfaces, however, reflect or transmit incident light directionally. They are capable of producing an optical image of their surroundings. Examples which may be mentioned are flat or curved mirrors and polished metal and glass surfaces (lenses).

In the transition range between these two extremes lie the objects referred to as glossy. These objects are of great importance since they are encountered very often. In particular, industrially produced objects of metal, plastic or even wood and other materials belong to glossy objects. The industrial processing of such materials (machining of metal and wood, injection molding of plastic, powder injection of metal and ceramic etc.) produces roughnesses in the range of a few micrometers, i.e. of the order of the wavelength of visible light (around 0.5 micrometers).

There is a wide selection of optical 3D sensors for diffusely scattering, optically rough surfaces. One of the most widespread methods is based on the projection of strip patterns. The patterns are projected in one direction and observed with a camera in another direction. Depending on the shape of the object being observed, the strips appear more or less deformed to the camera. The shape of the object can be inferred from the deformation of the strips. More than three strip patterns are generally projected, with the intensity of the strips assuming a sinusoidal profile.

Among the many other methods, the methods of the "shape from shading" group should be mentioned, in particular the photometric stereo method since the invention is based on it. From the brightness structure of an object surface, these methods infer its shape. A detailed description will be given below.

Methods which allow three-dimensional measurement for smooth surfaces are also known. Primarily interferometric methods are employed for testing simple surface shapes, such as flat or spherical surfaces (lenses, mirrors etc.). The Hartmann method or the Shack-Hartmann test are employed for more complexly shaped surfaces such as aspheres. Here, the deflection of a thin beam of rays by the object to be measured is observed. Other methods observe a grid pattern which is reflected or transmitted by the object surface. Depending on the shape of the latter, the grid appears more or less deformed. These methods can be combined under the heading deflectometric methods. A feature common to them is that the ray deflection is determined and the shape of the surface is inferred therefrom. The deflectometric methods are based on the reflection law or refraction law, which describes the relation between an incident ray, surface normal and the reflected or transmitted ray.

The measurement of surfaces in the transition range between optically rough and optically smooth surfaces, however, has not yet been resolved. The methods of both categories are deficient in this case. Although a sensor for rough surfaces can cope with occasionally occurring glossy points, such a sensor is unsuitable when gloss dominates over diffuse scattering. On the other hand, a sensor for optically smooth surfaces, in particular a deflectometric sensor, will have difficulty when the surface is too rough to allow clear optical imaging. For example, it is necessary to ensure that the fine structure of the grid is still visible. The method with sine strips places less stringent requirements on the quality of the surface, since sinusoidal strips allow a greater degree of haziness. But even here it is necessary to ensure that the structure of the strips is still visible.

The known optical sensors thus do not provide satisfactory results precisely for glossy surfaces in the transition range, which occur very frequently in industrially manufactured products.

It is therefore an object of the invention to provide a method and a device which avoid this disadvantage.

SUMMARY OF THE INVENTION

This object is achieved by a method having the features of the invention. It is distinguished in that two methods known per se, which seem mutually incompatible at first sight, are combined with the aid of a specially shaped optical element, in particular a scattering body. One of them is a photometric stereo method known per se. This method is employed for diffusely reflecting surfaces, but is deficient for glossy surfaces. The other is a deflectometric method for reflecting or transmitting surfaces. The application ranges of the two methods are expanded by the optical element, so that the resulting overall method provides particularly good results for glossy surfaces.

This object is also achieved by a device having the features of the invention. It is distinguished by a scattering body. This makes it possible to expand the application ranges of different methods of optical shape recording so that methods hitherto mutually exclusive on one body, in particular the deflectometric method and photometric stereo can advantageously be combined to form a new method, preferably for bodies with glossy surfaces.

An exemplary embodiment of the device which is distinguished in that the scattering body at least partially has a spherical, ellipsoid and/or rotationally symmetric structure is preferred. This offers the advantage that when the scattering body is illuminated, the radiation coming from it can be utilized very easily with the aid of known mathematical relations for recording the shape of an object.

Lastly, an exemplary embodiment in which a microscope and/or microscope objective is used for the optical imaging is preferred. This makes it possible to record the shapes of particularly small objects.

BRIEF DESCRIPTION OF THE DRAWINGS

The invention will be explained in more detail below with reference to a presentation of the combined method according to the invention and a drawing, in which.

DESCRIPTION OF PRIOR ART AND A PREFERRED EMBODIMENT OF THE INVENTION

The photometric stereo method belongs to a larger group of methods, which are known by the name "shape from shading". This methods involves using the variation of the brightness in an image to infer the shape of the object being imaged. If the photograph of a face is observed, for example, then brightness fluctuations are found even though it can be assumed that the reflection coefficient of the skin scarcely changes. Rather, these fluctuations are due to particular parts of the surface being oriented so that they radiate more light to the camera than others do. The brightness is maximal when the light from a source strikes the surface perpendicularly, while it is minimal with grazing incidence. A clear example is also provided by the illumination of the Earth's surface by the sun. The sun shines almost perpendicularly onto the Earth's surface at midday in summer, which leads to a high level of brightness. At sundown, the light just grazes the surface and there is low level of brightness. There are various formulations of shape from shading.

One group of methods deals with determining the shape of a surface assumed to be untextured (the same reflection coefficient everywhere). Other methods determine the position of the light source in addition to the shape of the object (source from shading). As regards the photometric stereo method, the position of the light source is known a priori and object texture is allowed. This is particularly important with a view to a versatile sensor since the texture is usually unknown in practice. A photometric stereo method will therefore be involved below.

Figure 1:
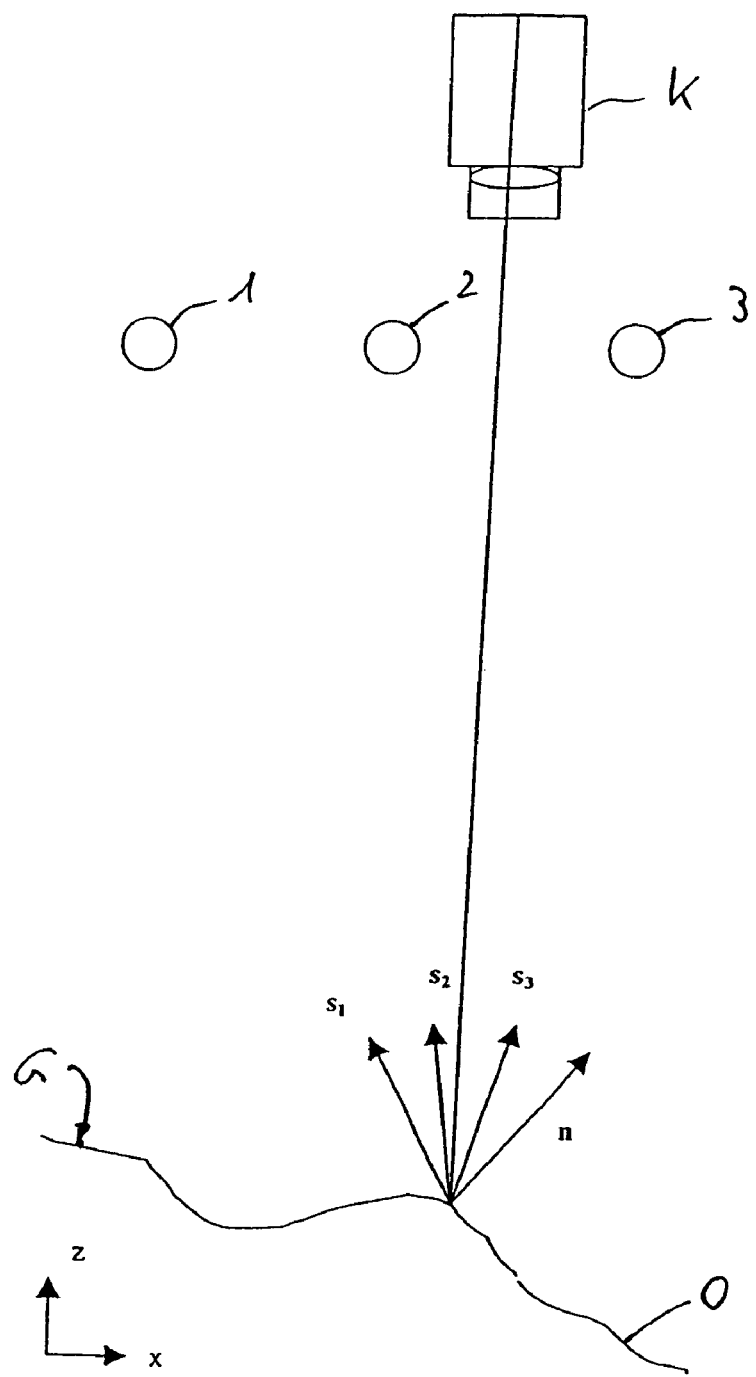
FIG. 1 shows a known method for carrying out a photometric stereo method.

The photometric stereo method which can be carried out with a device according to FIG. 1 will be presented here. It is assumed that an object G to be measured, which has the three-dimensional shape $z(x,y)$, is illuminated successively from three point light sources 1, 2, 3. In FIG. 1, the surface O of the object G is indicated by a line. In the simplest case, it can be assumed that the light sources are a large distance away and the illumination direction therefore remains constant over the object G for every source. The situation is particularly straightforward when the surface O can be represented as a Lambert scatterer (ideal nondirectional scattering). For a Lambert scatterer, the intensity scattered by the object G depends only on the illumination direction and the gradient of the object G, but not on the observation direction. A camera K takes a separate image for each of the three light sources 1, 2, 3. The positions of the object G and camera K remain fixed during this.

Mathematical representation of the photometric stereo method requires the three illumination directions and the normal vector $\bar{n}(x,y)$ of the surface O of the object G, also referred to as the object surface. The illumination directions are described by the vectors $\bar{s}_1$, $\bar{s}_2$ and $\bar{s}_3$. They point from the object surface to the light source in question.

$$\bar{s}_1 = (s_{11}, s_{12}, s_{13})^T$$

$$\bar{s}_2 = (s_{12}, s_{22}, s_{23})^T$$

$$\bar{s}_3 = (s_{31}, s_{32}, s_{33})^T$$

Since the light sources are a large distance away, these vectors remain approximately constant for all points of the surface O. The normal (perpendicular to the surface) vector $\bar{n}(x,y)$, however, varies according to the shape of the surface O and should be interpreted as a local normal vector.

$$\bar{n}(x,y) = (n_x(x,y), n_y(x,y), n_z(x,y))^T$$

It will be assumed that the surface $z(x,y)$ is differentiable and the normal vector exists everywhere. In the event that $z(x,y)$ is not differentiable owing to edges or discontinuities, the surface may be divided into differentiable sections. The camera K takes the images $E_1(x,y)$, $E_2(x,y)$ and $E_3(x,y)$ of the object G, i.e. one image per light source 1, 2 and 3. The camera K is a large distance away in the direction of the z axis, and each pixel receives the incident illumination strength $E_i(x,y)$ with $i=1, 2, 3$, which can be allocated to the coordinates $(x,y)$ of the surface O. According to Lambert's law, the scattered luminance varies with the cosine between the illumination direction $\bar{s}_i$ and the normal vector $\bar{n}(x,y)$. As an alternative, the scattered luminance may also be expressed via the scalar product of the illumination direction and the normal direction. The advantage of this representation is that the relationships can be represented linearly. Besides the gradient of the surface O and the illumination direction, the scattered luminance also depends on the local reflection coefficient $\rho(x,y)$ of the surface O (texture) and the illumination strength of the light sources and the parameters of the camera optics. All the constant factors, such as the illumination strength of the light sources and the parameters of the camera optics, are combined in the length of the illumination vector. It is therefore possible to write $$E_1 = \rho \cdot \bar{s}_1 \cdot \bar{n}$$

$$E_2 = \rho \cdot \bar{s}_2 \cdot \bar{n}$$

$$E_3 = \rho \cdot \bar{s}_3 \cdot \bar{n}$$

These three equations can be combined to form a single equation in matrix notation, if the following notation is introduced for the images.

$$\bar{E} = (E_1, E_2, E_3)^T$$

The illumination vectors form the rows of the illumination matrix $$S = \begin{pmatrix} s_{11} & s_{12} & s_{13} \\ s_{21} & s_{22} & s_{23} \\ s_{31} & s_{32} & s_{33} \end{pmatrix}$$

It is therefore possible to write $$\bar{E} = \rho \cdot S \cdot \bar{n}$$

Solving for $\bar{n}$ or $\rho$ gives $$\bar{n} = \frac{1}{\rho} \cdot S^{-1} \cdot \bar{E} \text{ with } \rho = \|S^{-1} \cdot \bar{E}\|$$

The illumination matrix S can always be inverted if the illumination vectors are linearly independent, i.e. when the object G and the three light sources 1, 2, 3 do not lie in a plane.

This mathematical description of the photometric stereo method with the aid of vectors offers the advantage over other descriptions (for example, descriptions with the aid of angles) that a linear relation is obtained between the normal direction, the illumination directions and the illumination strengths $E_1$, $E_2$ and $E_3$. This linear relation can readily be solved mathematically for the quantity of interest, the normal direction: it is merely necessary to invert the illumination matrix. Three-dimensional illumination arrangements in which the normal direction and the various illumination directions do not lie in a plane can therefore be handled well, which is not possible for other descriptions (for example, descriptions with the aid of angles). This is of great importance in what follows for the method according to the invention, since it is also based on a vector description and can therefore accommodate three-dimensional illumination arrangements and measure three-dimensional objects. Once the normal vector has been determined, the shape of the object surface z(x,y) can easily be represented with the aid of the partial derivatives p and q with respect to x and y. This is advantageous for the subsequent integration of the shape z (x,y).

$$p = \frac{\partial z}{\partial x} = -\frac{n_x}{n_z}$$

$$q = \frac{\partial z}{\partial y} = -\frac{n_y}{n_z}$$

This description of photometric stereo is valid for Lambert surfaces and light sources far away. This special case was selected in order to be able to present the function of the method as simply as possible. It is possible to adapt the method for light sources a finite distance away and surfaces which do not obey the Lambert law, although this will not be pursued here.

So far, the shape data of the surface O are provided as a normal vector $\bar{n}(x,y)$ or as partial derivatives (also referred to here as the local gradient)

$$p = \frac{\partial z}{\partial x} = -\frac{n_x}{n_z}$$

$$q = \frac{\partial z}{\partial y} = -\frac{n_y}{n_z}.$$

In order to obtain the shape z(x,y), it is necessary to integrate the partial derivatives.

Figure 2:
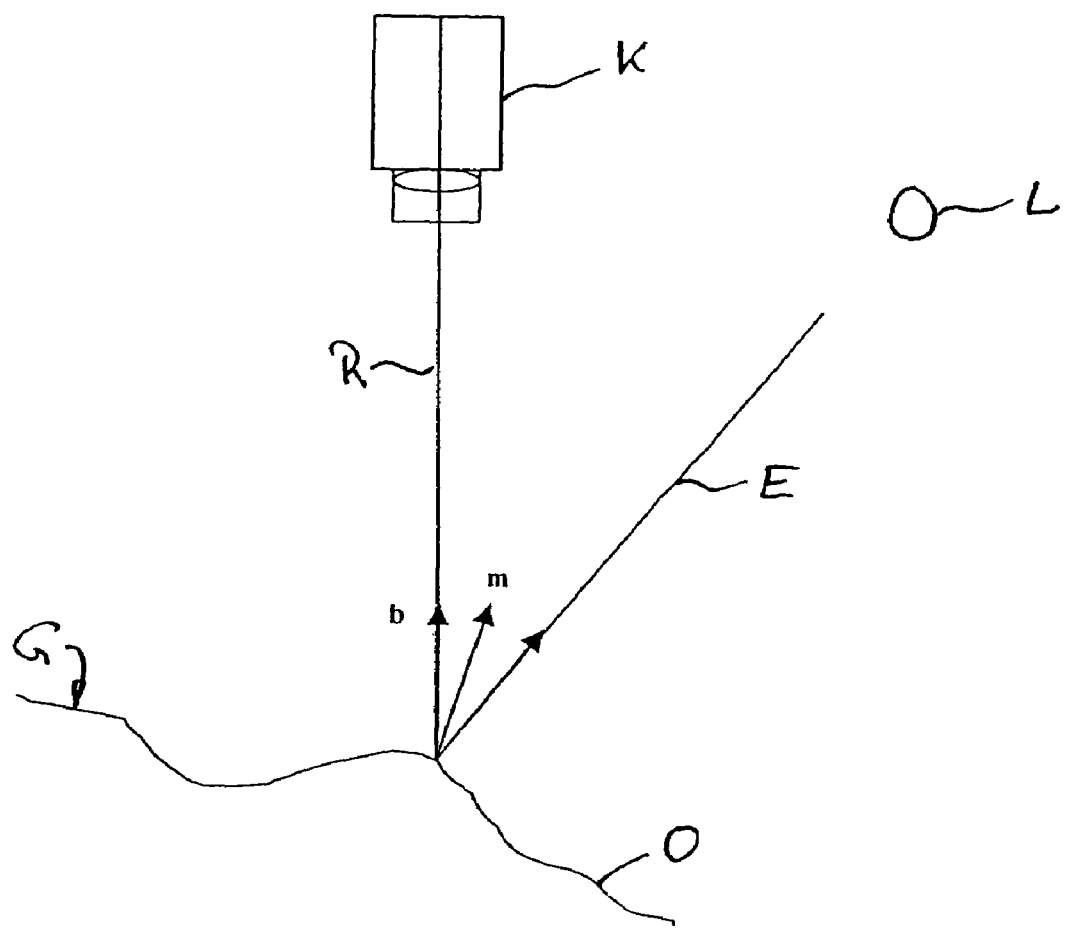
FIG. 2 shows a partial representation of a known device for carrying out a deflectometric method.

Besides the photometric stereo method, the invention also utilizes deflectometry. A feature common to deflectometric methods is that they determine the deflection of a ray by a reflecting or transmitting surface, and infer its shape therefrom. They are based on the reflection law or refraction law, which describes the relation between an incident ray, the surface normal and the reflected ray (see FIG. 2). FIG. 2 shows a device having a camera K which is aimed at an object G illuminated by a light source L, in order to record its surface O. In the case of reflection, the incident ray E, reflected ray R and surface normal $\bar{m}$ lie in a plane. The angles between the incident ray and the surface normal, and between the reflected ray and the surface normal, are equal. A simple description can be obtained if the incident ray E is denoted by the unit vector from the surface O in the direction of the light source L, and the reflected ray R is similarly denoted by the unit vector from the surface O in the direction of observation $\bar{b}$. The normal vector then forms the sum (normalized to a length of one) of the vectors of the incident ray E and of the reflected ray R.

Deflectometric methods have previously been used for optically smooth surfaces. The photometric stereo method and the deflectometric method seem mutually incompatible at first sight, since the surface to be measured cannot simultaneously be optically rough and optically smooth. Nevertheless, the two methods can be advantageously combined if a suitable optical element is introduced. The combination of the two methods will be referred to below as "photometric deflectometry". This optical element is a suitably shaped, preferably hemispherical translucent scattering body, in particular at least partially with an rotationally symmetric structure. The deflectometric part of the method finds its counterpart in the glossy surface of the specimen, and the photometric in the scattering body. With the described combination of the method, it is possible to measure very glossy surfaces.

Figure 3:
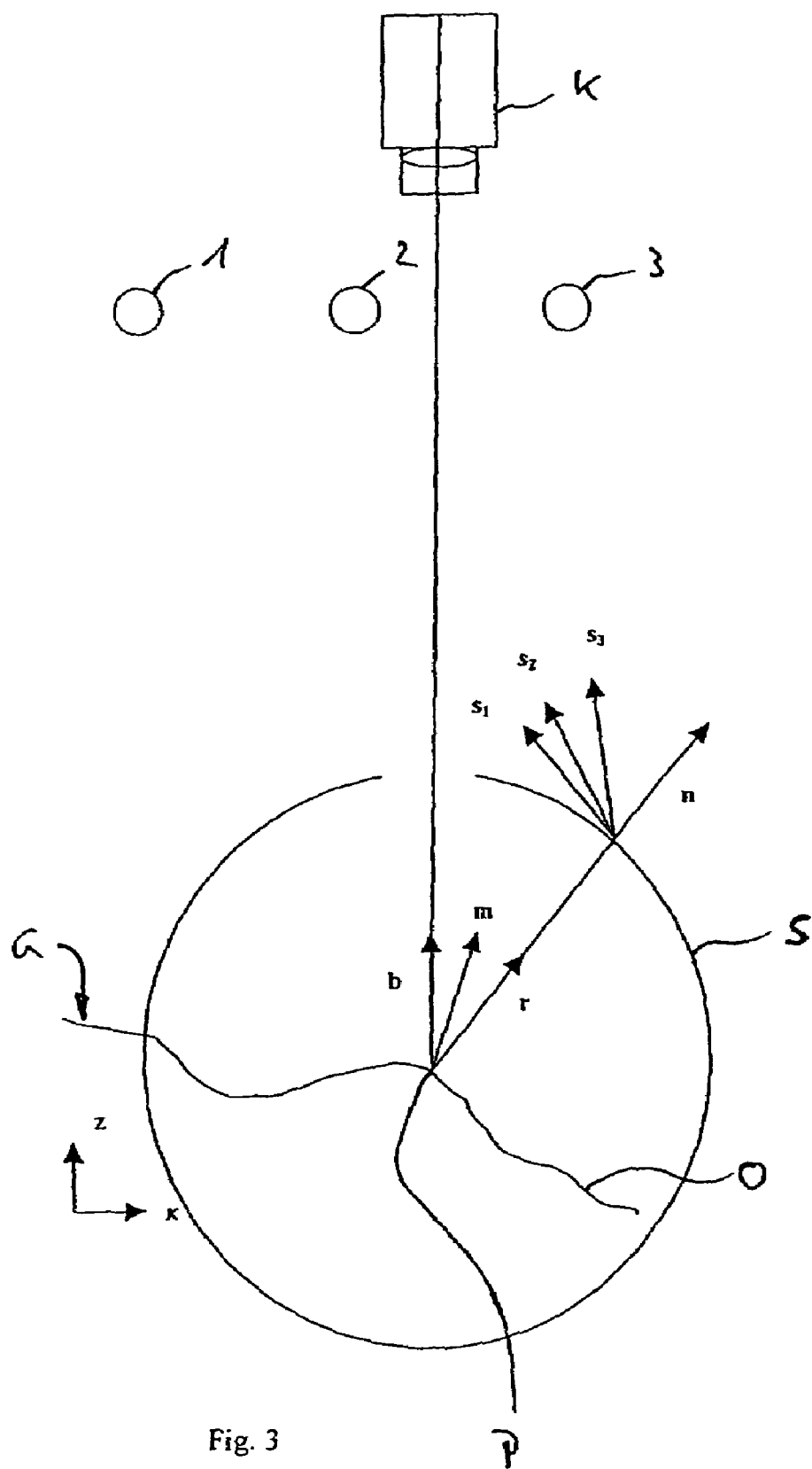
FIG. 3 shows a schematic representation of an exemplary embodiment of a device for carrying out the optical shape recording method according to the invention.

A device for photometric deflectometry is represented in FIG. 3, and is preferably constructed as follows: a camera K is aimed at a glossy object G, also referred to as the specimen. Its surface O reflects light coming from a preferably hemispherical scattering body S in the direction of the camera K. If the method is to be used in transmission instead of reflection, the camera K must be aimed at the object G in the opposite direction, here from below. Owing to its roughness, the object G generates a more or less blurred image of the scattering body S rather than a clear one. The blurred image does not represent an hindrance for the method, and as would otherwise be the case with deflectometric methods. This will be dealt with in more detail below. For its part, the scattering body S is illuminated by a plurality of light sources 1, 2, 3, ... (preferably three), as is usual for photometric methods. The associated illumination vectors from a point P of the scattering body S, selected by way of example, to the light sources are $\bar{s}_1$, $\bar{s}_2$ and $\bar{s}_3$. The object G and the light sources 1, 2, 3 preferably do not lie in the same plane but are arranged spatially, in three dimensions.

Preferably, the light source 1 is switched on initially, the others being switched off, and the camera K takes an image 4a of the object G under these illumination conditions. This procedure is repeated after the light source 2 has been turned on and the other light sources have been switched off, and likewise for light source 3 etc. Images 4b, 4c etc. are thereby taken. Optionally, the light sources may be switched on in a different sequence. Likewise, the light sources may be switched on together, for example light sources 1 and 2, then light sources 2 and 3, and lastly light sources 3 and 1. Arrangements with more or fewer than three light sources are also possible.

The recording is followed by evaluation of the images 4a, 4b, 4c according to the photometric stereo method. As described above, the normal vector $\bar{n}(x,y)$ or the gradient of the scattering body S can be inferred from the position of the light sources 1, 2, 3 and the gray values of the image points of the images 4a, 4b, 4c.

$$\vec{n} = \frac{1}{\rho} \cdot S^{-1} \cdot \vec{E}$$

with $$\rho = \|S^{-1} \cdot \vec{E}\|$$

This is the surface normal of the object G in the conventional photometric stereo method, but it is the normal of the scattering body S in photometric deflectometry. This is a very essential innovation: The photometric stereo method is used to uniquely encode every position on the scattering body surface. The encoding may be thought of as divided into various steps:

The shape of the scattering body is selected so that every position on the scattering body surface has a normal vector $\bar{n}$ which occurs only once. It is preferably a sphere, an ellipsoid, a rotationally symmetric body or parts thereof. Reciprocally, for each normal vector there is only one position on the scattering body. The allocation is therefore unique.

Furthermore, the photometric stereo method allocates the back-scattered luminances to each normal vector $\bar{n}$ of the scattering body surface and vice versa.

The luminances back-scattered by the scattering body are in turn allocated uniquely to the illumination strengths $E_1$, $E_2$ and $E_3$ of the camera images via the reflection at the object surface.

If the position on the scattering body is now uniquely allocated to the normal vector $\bar{n}$, the latter is uniquely allocated to the back-scattered luminance and this is in turn allocated to the illumination strengths $E_1$, $E_2$ and $E_3$ of the images recorded by the camera, then the position and illumination strengths are uniquely allocated to one another. From the illumination strengths in the images, it is therefore possible to deduce which position of the scattering body has scattered the light. This means that the scattering body surface has been uniquely encoded. With just three illumination directions, any position of the scattering body surface can be encoded unequivocally in three-dimensional space. This encoding has clear advantages over other methods which, for example, locally illuminate the scattering body step by step. Such methods require a multiplicity of illumination directions but can only record a single line on the scattering body, which corresponds to two-dimensional recording of the object.

With the method according to the invention, conversely, with just three illumination directions it is possible to two-dimensionally encode the scattering body and therefore allow three-dimensional measurement of the object. The normal $\bar{m}(x,y)$ of the object surface is then determined from the unique encoding of the position and from the normal vector on the scattering body.

$$\bar{m}(x,y) = (m_x(x,y), m_y(x,y), m_z(x,y))^T$$

A scattering body S designed as a sphere will be considered below. In particular, a spherical surface has the special property that every unit vector $\bar{r}(x,y)$ from the center in the direction of the surface (radial vector) is parallel to the normal vector $\bar{n}(x,y)$ at this point (see FIG. 3). The radial vector and the normal vector of the object G are in turn related to one another via the reflection law or refraction law (deflectometry). If the object G is small compared to the radius of the sphere, then all object points lie approximately at the center of the sphere. The normal vector on the object can be calculated even without this assumption, but a small object will be assumed here in order to allow a simple presentation. The z axis of the coordinator system is selected so that it extends parallel to the optical axis of the camera K. According to the reflection law, the following applies for the normal vector $\bar{m}(x,y)$ of the surface $\bar{m}(x,y) = const \cdot (\bar{n} + \bar{b})$ with the unit vector in the direction of observation $\bar{b}$ and the constraint that $\bar{m}$ and $\bar{n}$ are unit vectors. It is therefore possible to determine the normal vector of the object G for a multiplicity of points of the object surface O, the partial derivatives p and q from this, and from these in turn the shape of the surface z(x,y) of the object G by integration.

Yet even without integrating the local gradients p(x,y) and q(x,y) to form z(x,y), it is already possible to draw valuable conclusions about the object surface. Contrary to expectation, it is even expedient to stop at the evaluation actually before the integration step. A graphical, grayscale representation of the gradient (intermediate result) is in fact preferable to a graphical representation of z(x,y) (final result) for many applications. This is surprising insofar as a final result generally contains more information than an intermediate result. The same applies for a representation of the local normal vector of the object surface, or its components. The gradient and normal vector are directly related so that, for the following argument, the term "gradient" may also be replaced by the term "normal vector" or its respective components.

The gradient representation offers advantages, in particular, when the task is to represent the shape of the surface to a human observer (visualization) or to analyze distinctive features (interpretation, evaluation). The gradients p(x,y) and q(x,y) are output as grayscale encoded images on a monitor, printer etc. The gradient representation brings out even very small indentations, elevations, grooves and ridges.

The advantages of the gradient representation are based on the fact that the human visual faculty is by its very nature accustomed to interpreting gradient data. Human vision uses brightness shadings (as in shape from shading and the photometric stereo method) to obtain a spatial conceptualization of the object being observed. There are furthermore other mechanisms, for example stereo vision, which also contribute to spatial impression. Compared to the other mechanisms of spatial vision, gradient vision is the most accurate source of information. With suitable illumination and a suitable viewing angle, experienced observers are capable recognizing irregularities of less than 10 micrometers from the shading itself. Besides shadings, light reflections from an object or specimen (as in the deflectometric method) impart a spatial impression which allows extremely fine details to be recognized.

If the grayscale encoded gradient representation is combined with a gradient measuring method, such as the photometric stereo method or photometric deflectometry, even irregularities that cannot be seen by the human eye on the real object can be made visible. For humans, texture (local brightness) and gradient information of the object are always mixed. For example, it is difficult to assess whether a line perceived as dark on an object is due to a shape feature, for example a groove, or a darkly colored marking. Photometric deflectometry and the photometric stereo method can offer assistance here. They take more than one illumination situation into account (unlike the visual faculty) and make it possible to separate gradient data from texture. When visualized as a gradient image, even invisible features can thus be made visible.

The combination of gradient measurement and gradient representation also offers advantages in terms of accuracy. It is possible to record details in the range of a few micrometers. The gradient is visualized and the shading effects can be computationally emphasized and accentuated.

These gradient measuring methods are furthermore robust with respect to tilting and rotation of the object relative to the illumination. For example, the human observer can recognize a flat indentation on a glossy object only with a very particular direction of the illumination. The situation is similar with many image processing methods. The choice of illumination is particularly critical for glossy surfaces. If only very small changes in the position of the object surface occur with respect to the illumination, for example due to inaccuracies in the delivery or deviations of the object itself, then the view of the surface changes fundamentally because of differing light reflections. The case is very different with the photometric deflectometric method. Reproducible measurements and objective evaluation are possible even for a tilted glossy object. The gradient representation is furthermore advantageous for the automatic machine evaluation of surfaces. The data processed as a gradient facilitate automatic evaluation, or make it possible for the first time, preferably by a computer or another electronic analysis unit. The aforementioned advantages of gradient representation apply accordingly for automatic evaluation.

Owing to the many advantages of a gradient representation, it could also be envisaged for other methods which record the shape $z(x,y)$ directly. The gradients $p(x,y)$ and $q(x,y)$ could then be obtained by numerical differentiation. It should, however, be borne in mind that differentiation amplifies particularly the high-frequency noise which is contained in any real measurement. This is not the case with the gradient measuring methods, in particular photometric deflectometry and the photometric stereo method. In this case, the gradient is measured directly. Although minor measurement noise is also contained here, the step of numerical differentiation which could worsen this noise is obviated.

A gradient measuring method together with a gradient representation is thus an advantageous combination of a measuring method and visualization.

At this point, it should also be mentioned that the photometric deflectometry method can even be used for optically rough surfaces. The object surface delivers a more or less blurred image of the scattering body S. In other deflectometric methods, this is a problem since finely structured patterns such as strips, points etc. generally need to be imaged. This is not the case with photometric deflectometry. The brightness on a spherical scattering body varies so uniformly that distortions can scarcely occur even with very blurred imaging.

Photometric deflectometry is therefore superior to other deflectometric methods for rough and smooth glossy surfaces. Moreover, it is also superior to the photometric stereo method which can only be used for diffusely scattering surfaces.

Another advantage of this method is that just three camera recordings (corresponding to three illumination directions) are sufficient for determining the shape of the object. The time for a complete measurement can therefore be kept very short, as is desirable in industrial measuring and testing technology. A further reduction to merely a single camera recording is achieved, in particular, when the three light sources are encoded in the colors red, green and blue and an electronic color camera K is used for the observation. The color channels red, green and blue contain the images $4a$, $4b$, $4c$ of the correspondingly encoded illumination directions. There is, however, a precondition that the object must be one-colored.

Reducing a measurement to a single camera recording represents a crucial advance. With a correspondingly short exposure time, similarly as flash lamp recording in photography, even moving objects can be recorded without sufficient motion blurring.

The discussion so far has assumed that glossy objects are intended to be measured. The described method and the associated device may nevertheless also be used beneficially for diffusely scattering objects. On these surfaces, the principle of photometric stereo does not retain directly to the scattering body 1, but instead the object itself. The scattering body 1 together with the light sources 1, 2, 3 etc. act like a series of extended light sources. Spatially extended light sources have the advantage that they can minimize coherent optical noise due to speckling. Coherent noise has repercussions on the shape measurement inaccuracy in all optical 3D sensors. The described method therefore makes it possible to reduce the measurement inaccuracy for diffuse objects. This property is furthermore conducive to a precise measurement of glossy surfaces.

It is particularly preferable for the results of the shape measurement to be provided as a software file. This facilitates their further processing.

It is furthermore possible to use a microscope and/or a microscope objective for the optical imaging. In this way, the existing optics of the camera K are replaced and/or supplemented so that even the surfaces of particularly small objects can be measured.

Light-emitting diodes (LEDs) may preferably be used for the illumination. These are convenient to produce and can be operated rapidly and straightforwardly.

Lastly, it is conceivable to use one or more flash lamps for the illumination. Owing to the short illumination time of flash lamps, this can reliably avoid any measurement errors due for example to relative motion between the light source, camera K and the object to be measured, which may for example be attributable to vibrations or moving objects. Furthermore, flash lamps advantageously have a high luminosity so that the camera K may accordingly be designed with a lower photosensitivity.

The invention claimed is:

1. A method for at least one of optical shape recording and evaluation of an optically smooth surface, an optically glossy surface or an optically rough surface, the method combining a photometric stereo method and a deflectometric method, the method comprising:

two-dimensionally encoding positions on a surface of a scattering body with reference to a shape of the scattering body, such that one vector normal to each position on the surface of the scattering body is uniquely allocated to each position on the scattering body surface;

uniquely allocating to each normal vector a luminance back-scattered by the scattering body; and allocating the back-scattered luminance to illumination strengths of recorded images.

2. The method as in claim 1, wherein the scattering body has a shape of a sphere, an ellipsoid, a rotationally symmetric body or parts thereof.

3. The method as in claim 1, further comprising providing a result of the at least one of optical shape recording and the evaluation in a form of a software file.

4. The method as in claim 1, wherein the at least one of optical shape recording and evaluation is performed via an electronically operating camera.

5. The method as in claim 4, wherein the camera is a color camera.

6. The method as in claim 1, further comprising illuminating the surface with color-coded illumination.

7. The method as in claim 1, wherein the scattering body comprises an extended luminous scattering body surface for reducing coherent speckle noise.

8. The method as in claim 1, wherein the at least one of optical shape recording and evaluation comprises at least one of visualizing and electronically evaluating at least one of a local gradient and a local normal vector of the surface.

9. The method as in claim 7, comprising at least one of visualizing and electronically evaluating at least one component of at least one of a local gradient and a local normal vector of the surface.

10. The method as in claim 8, wherein the at least one of the local gradient and the local normal vector is represented by being encoded as at least one of a grayscale and a color shade.

11. The method as in claim 9, wherein the at least one component of the at least one of the local gradient and the local normal vector of the surface is represented by being encoded as at least one of a grayscale and a color shade.

12. A device for optical shape measurement for at least one of optical shape recording and evaluation of an optically smooth surface, an optically glossy surface or an optically rough surface by combining a photometric stereo method and a deflectometric method, the device comprising:

a scattering body comprising a scattering body surface;

at least one optical recorder for receiving illumination reflected off the surface;

at least one light source positioned to scatter illumination to the scattering body surface;

a processor-readable medium incorporating two-dimensionally encoded positions on the scattering body surface with reference to a shape of the scattering body, such that one vector normal to each position on the scattering body surface is uniquely allocated to each position on the scattering body surface; and a processor operable to uniquely allocate to each normal vector a luminance back-scattered by the scattering body and to allocate the back-scattered luminance to illumination strengths of recorded images.

13. The device as claimed in claim 12, wherein the scattering body has at least one of at least partially a spherical, ellipsoid and rotationally symmetric structure.

14. The device as in claim 12, further comprising using at least one of a microscope and a microscope objective for the optical imaging.

15. The device as in claim 12, wherein the light source comprises at least one light-emitting diode for the illumination.

16. The device as in claim 12, wherein the light source comprises at least one flash lamp for the illumination.

17. The device as claimed in claim 12, wherein the optical recorder comprises a camera.

18. The method as claimed in claim 1, comprising three light sources positioned and configured for illuminating the surface.

* * * * *